United States Patent [19]
Keskitalo et al.

[11] Patent Number: 5,799,004
[45] Date of Patent: Aug. 25, 1998

[54] METHOD FOR ELIMINATING MULTIPLE-ACCESS INTERFERENCE AND A MOBILE STATION

[75] Inventors: Ilkka Keskitalo, Jääli; Arto Kiema, Oulu; Jari Savusalo, Oulu; Petri Jolma, Oulu, all of Finland

[73] Assignee: Nokia Telecommunications, Espoo, Finland

[21] Appl. No.: 637,659

[22] PCT Filed: Oct. 21, 1994

[86] PCT No.: PCT/FI94/00478

§ 371 Date: Jul. 2, 1996

§ 102(e) Date: Jul. 2, 1996

[87] PCT Pub. No.: WO95/11259

PCT Pub. Date: May 4, 1995

[30] Foreign Application Priority Data

Oct. 27, 1993 [FI] Finland .................. 934759

[51] Int. Cl.$^6$ .................................... H04J 13/02
[52] U.S. Cl. .................. 370/335; 370/342; 455/305
[58] Field of Search .................. 455/422, 423, 455/454, 501, 515, 524, 63, 303, 304, 305; 370/320, 335, 342; 375/200, 346, 349

[56] References Cited

U.S. PATENT DOCUMENTS 5,105,435  4/1992  Stilwell ........................ 455/305
5,109,390  4/1992  Gilhousen et al. .............. 370/335
5,164,958  11/1992  Omura ............................ 375/1
5,179,571  1/1993  Schilling ......................... 375/1
5,323,418  6/1994  Ayerst et al. ................... 370/342
5,351,269  9/1994  Schilling ........................ 370/335

FOREIGN PATENT DOCUMENTS 0 566 550  10/1993  European Pat. Off. .......... H04B 7/26
WO 92/11722  7/1992  WIPO ........................... H04L 27/30

OTHER PUBLICATIONS

Cooper, G. et al., "Detection of Spread–Spectrum Signals", *Modern Communication and Spread Spectrum*, McGraw–Hill, New York, 1986, chapter 12.

Primary Examiner—Benedict V. Safourek
Attorney, Agent, or Firm—IP Group of Pillsbury Madison & Sutro LLP

[57] ABSTRACT

A mobile station, and a method for eliminating multiple-access interference in a CDMA cellular radio system having a plurality of cells each having at least one base station communicating with mobile stations residing in the respective cell and informing the respective mobile stations of at least one spreading code used in a neighboring cell, the mobile stations measuring the code phase and power level of a channel of the neighboring cell using the known spreading code. To reduce the effect of multiple-access interference, the signal received at the mobile station is utilized in the detection of the desired signal by using the code phase and power level of the measured channel using the known spreading code of the neighboring cell.

13 Claims, 2 Drawing Sheets

METHOD FOR ELIMINATING MULTIPLE-ACCESS INTERFERENCE AND A MOBILE STATION

This application claims benefit of international application PCT F194 00478filed Oct. 21, 1994.

BACKGROUND OF THE INVENTION

The invention relates to a method for eliminating multiple-access interference in a CDMA cellular radio system having cells each comprising at least one base station communicating with mobile stations residing in the cell and informing the mobile stations of at least one spreading code used in a neighbouring cell, the mobile stations measuring the code phase and power level of a channel of the neighbouring cell using the known spreading code.

CDMA is a multiple access method based on the spread spectrum technique, and it has been applied recently in cellular radio systems together with the earlier developed FDMA and TDMA techniques. CDMA has several advantages over the earlier developed techniques, such as higher spectral efficiency and simple frequency planning.

In CDMA, the narrow-band data signal of the user is multiplied to a relatively broad band with a spreading code having a considerably broader band than the data signal. Known test systems use bandwidths such as 1.25 MHz, 10 MHz and 25 MHz. The multiplication spreads the data signal over the entire available band. All users transmit on the same frequency band simultaneously. A spreading code is assigned to each connection between a base station and a mobile station, and the signals of different users can be distinguished from each other in the receivers on the basis of the spreading code of each user.

Correlators provided in the receivers are synchronized with the desired signal, which is recognized on the basis of the spreading code. In the receiver, the data signal is restored to the original band by multiplying it again with the same spreading code as at the transmission stage. In an ideal case, signals multiplied with some other spreading code do not correlate and are not restored to the narrow band. From the viewpoint of the desired signal, they thus appear as noise. One attempts to select the spreading codes of the system in such a way that they are orthogonal with respect to each other, i.e. do not correlate with each other.

In a typical cellular radio environment, signals between a mobile station and a base station propagate over several paths between a transmitter and a receiver. This multipath propagation is mainly due to reflections of the signal from the surrounding surfaces. Signals that have propagated over different paths arrive at the receiver at different times due to their different propagation time delays. CDMA differs from conventional FDMA and TDMA in that the multipath propagation can be utilized in signal reception. A so-called rake receiver comprising one or more rake branches or correlators is a widely used receiver solution in CDMA. Each correlator is an independent receiver unit, the function of which is to assemble and demodulate one received signal component. The implementation of a rake branch is described more closely in *Modern Communications and Spread Spectrum*, Chapter 12, G. Cooper, C. McGillem, McGraw-Hill, New York 1986. A CDMA receiver typically comprises a separate impulse response measuring equipment, the function of which is to search out different signal components transmitted with a desired spreading code, and detect the phases of the signal components. Each rake branch or correlator can be controlled so that it will be synchronized with a signal component propagated over a different path. In a conventional CDMA receiver, the signals of the correlators are combined in an advantageous way, thus obtaining a signal of high quality. The signal components received by the correlators may have been transmitted from one base station, or in the case of macrodiversity, from a plurality of base stations.

Generally speaking, the spreading codes are not orthogonal at all values of the delay. Accordingly, signals delayed in different ways cause interference in the signal detection. Such interference caused by different users to one another is called multiple-access interference.

Each base station transmits to all of the mobile stations residing within its area on the same frequency band. The same frequency band is typically also used in adjacent cells. To minimize multiple-access interference, the spreading codes used by each particular base station within a cell are attempted to be selected so that they are orthogonal with respect to each other. Power control is also used to eliminate the effect of multiple-access interference within a cell.

In the CDMA cellular radio system, it is possible to use a channel called a pilot channel. The pilot channel is a data-unmodulated signal transmitted with a certain spreading code. Thus it contains no data. The pilot channel is transmitted on the same frequency band on which the actual traffic channels are located; the pilot channel can be distinguished from its traffic channels only on the basis of the spreading code. The pilot channel is used e.g. in power measurements and in generating a coherent phase reference. A base station may also inform the mobile stations moving within its area about the spreading codes of the pilot channels of the base stations of neighboring cells. In this way, the respective mobile stations are able to identify the transmissions of the neighbouring cells. This informing can be utilized in the handover procedure.

When a mobile station approaches the edge of the coverage area of its presently dedicated base station, a signal from a neighboring base station, which is within the same frequency range as the transmission of the presently dedicated base station, begins to appear as an increasingly strong interference in the receiver of the mobile station. This interference is particularly disadvantageous, as the spreading codes used in the neighboring cells are not necessarily fully orthogonal with the codes used in the mobile station's own present cell. Moreover, the power control of the base station of the neighboring cell, if there is any in use, does not take the adjacent cells into account.

SUMMARY OF THE INVENTION

The object of the persent invention is to reduce the effect of multiple-access interference in a situation where a desired signal from a presently dedicated base station is at minimum and interference from at least one neighbouring cells is at maximum, i.e. within the boundary area of at least two cells.

This is achieved by means of a solution according to the method described in the foregoing background section which is characterized in that the code phase and power level of the measured channel using the known spreading code of the neighboring cell are utilized in the detection of the desired signal from the received signal at the mobile station.

The invention also relates to a mobile station intended for use in a CDMA cellular radio system having cells each comprising at least one base station communicating with mobile stations residing in the cell, the mobile station having means for measuring the code phase and power level of a channel using a known spreading code of a base station in a neighboring cell. The mobile station according to the invention is characterized in that the mobile station comprises means for detecting a desired signal from a received signal by utilizing the code phase and power level of the measured channel using the known spreading code of the neighboring cell.

As already mentioned, a CDMA receiver is typically implemented by the rake technique, in which the receiver comprises several correlator branches which can synchronize with signal components propagated in different ways. In the solution according to the invention, however, correlator branches are utilized in eliminating interference. All of the correlators are not synchronized with a signal propagated over several paths from the base station to the antenna of the mobile station and using the base station's own spreading code; instead, one or more of the correlators are synchronized with a signal transmitted from the base station of a neighboring cell and using a known spreading code assigned to another connection. In this way, the receiver is able to utilize information about the code phases and power levels of the signals in the detection of the desired signal.

The method according to the invention is particularly advantageous when the CDMA system uses complementary codes as spreading codes. In such a system, there occurs no intra-cell multiple-access interference, as all of the spreading codes used within the cell are orthogonal with respect to each other. All of the interference thus originates from the neighbouring cells.

A further advantage of the method according to the invention is that the base station can reduce the transmission power of a signal to a mobile station without deteriorating the quality of the connection, as the invention allows the quality of the signal of the mobile station to be improved in areas where the mobile station is at the greatest distance from the base station. In this way, the adjacent cells are interfered with to a lesser extent than what has been possible previously.

BRIEF DESCRIPTION OF THE DRAWINGS

In the following the invention will be described more closely with reference to the examples of the attached drawings, in which.

DETAILED DESCRIPTION

Figure 1:
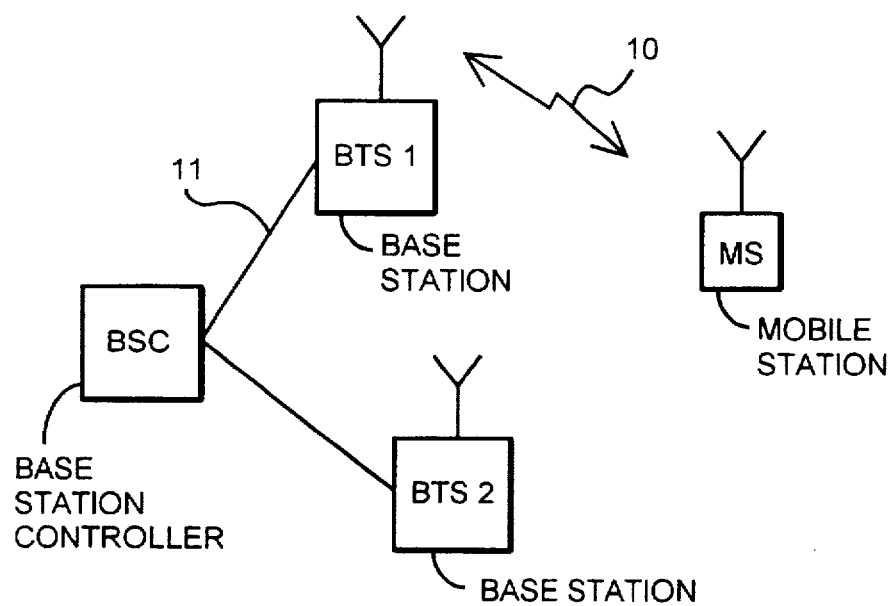
FIG. 1 shows a diagram illustrating a portion of a cellular network where the method according to the invention is applicable.

FIG. 1 is a diagram illustrating a portion of a CDMA cellular radio system. Two base stations BTS1 and BTS2 are connected to a base station controller BSC by digital transmission links 11. The coverage area of one base station BTS typically forms one radio cell. The base station controller communicates with the other parts of the cellular network and with a fixed network.

Figure 2:
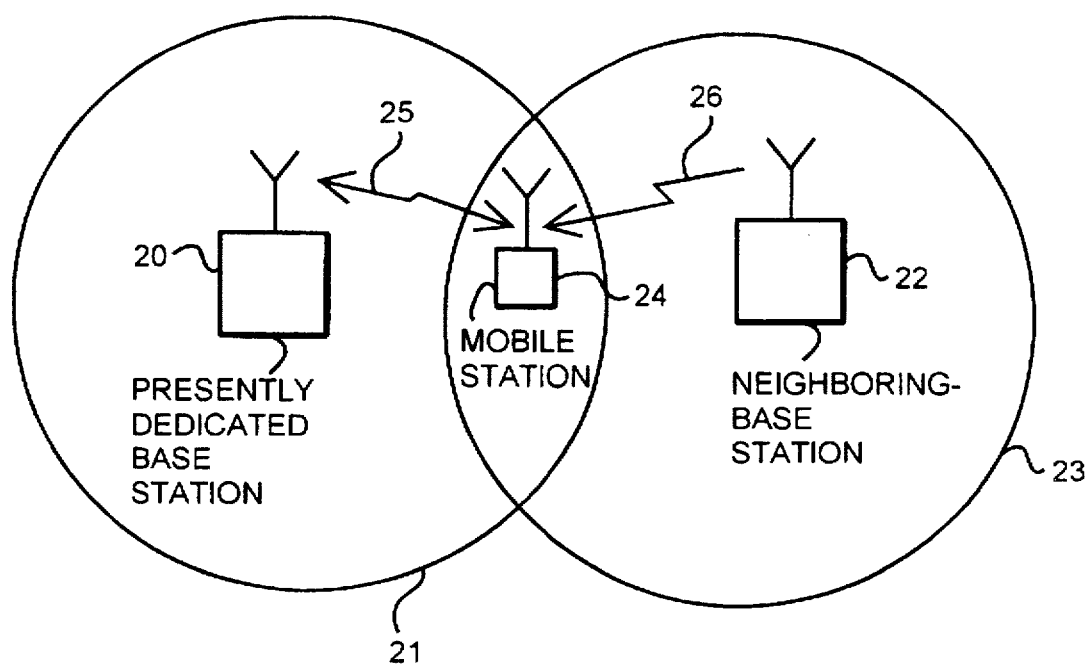
FIG. 2 illustrates a situation where a mobile station is located close to the edge of a cell.

FIG. 2 shows a situation where a mobile station 24 in communication with the base station 20 servicing a cell 21 has moved to the boundary area between cells 21 and 23. Cell 23 is serviced by the base station 22. In the following, one preferred embodiment of the invention will be described by way of example with reference to the situation shown in FIG. 2, where there is a single neighboring cell, assuming that the system utilizes a pilot channel, without, however, limiting the invention to this embodiment.

Upon approaching the edge of cell 23, the mobile station experiences an increase in the interference level of the connection when it is receiving a signal from its presently dedicated base station. This multiple-access interference is caused by the base station 22 servicing cell 23, the transmissions of the base station 22 taking place at the same frequency as in the mobile station's own present cell 21. The spreading codes used in the neighboring cells are not fully orthogonal with respect to each other, which results in increased level of interference in a signal received at the receiver of the mobile station with its own spreading code. This phenomenon is particularly apparent when complementary codes are used, in which case there occurs no intra-cell multiple-access interference. Upon approaching the edge of the cell, a previously noiseless signal deteriorates gradually.

The base station 20 has informed the mobile station 24 about the spreading codes of the pilot channels of some of the neighboring base stations on one of the control channels assigned to the connection between the base station 20 and the mobile station 24. The searcher branch of the CDMA receiver of the mobile station 24 searches both for multipath-propagated signal components transmitted from its presently dedicated base station 20 with the mobile station's own spreading code and signals provided with the pilot spreading codes of the neighboring base stations.

When the mobile station 34 approaches the edge of cell 23, its searcher branch detects the transmission on the pilot channel of the neighboring base station 22, is synchronized with it and measures the power level of the transmission. The mobile station 24 reports these data to its presently dedicated base station 20 in order that the handover to the neighboring base station 22 can be started in due course when the strength of the pilot signal of the base station 22 as detected by the mobile station 24 has become high enough.

The mobile station is also able to request from its presently dedicated base station information about the spreading codes of the traffic channels of the neighboring base station 22 for the purpose of interference elimination. The present dedicated base station 20 forwards the request to the base station controller BSC, which transmits the requested data via the base station 20 to the mobile station 24. According to the needs and capacity, the mobile station can be informed of one or several spreading codes.

If the base stations employ connection-specific power control, they transmit at unequal transmission powers on different connections. The greater the distance from the mobile station to a base station, the higher the power level on which a base station is able to transmit a signal addressed to this particular mobile station. Connection-specific power control is preferred when codes used within a cell do not correlate with each other, such as when orthogonal codes are used. In addition, connection-specific power control is to be preferred when the system employs interference elimination, as methods for interference elimination are the more efficient, the clearer the differences between the power levels of the interfering signals. In such a case, the base station controller may inform the mobile station only of spreading codes used on connections over which the neighboring base station uses a high transmission power level, that is, on connections that interfere with the mobile station most severely.

After having been informed of the spreading codes of the traffic channels, the searcher branch of the mobile station is able to detect the code phase of the desired traffic channels and to synchronize with them and, if required, to measure the power level of the transmission. If the connection-specific power control is not in use, it is not necessary to measure the power level, as the power level of the traffic channel can be estimated from the power of the pilot channel already measured.

The mobile station is thus able to receive both the desired signal from its presently dedicated base station and a signal from a neighboring base station the spreading code of which it knows. Interference elimination may be an iterative process, so that the number of the rake correlators of the CDMA receiver does not limit the number of signals to be eliminated.

According to a preferred embodiment of the invention, the mobile station calculates the cross-correlation between the received desired signal and interfering signals received with the known spreading codes. The code phases of the signals have to be taken into account in the calculation, as the correlation of the spreading codes with respect to each other depends on the phase difference between them. In addition to this, the result has to be weighted by the received power level of each signal to find out the actual interference caused by each signal in the desired signal.

After having calculated the interference caused by the received signals of the neighboring cell, the mobile station can eliminate the effect of this interference from the desired signal. To eliminate the interference, each detected interfering signal is again multiplied with the spreading code and subtracted from the received signal, which then can be re-detected. The re-detected signal no longer contains the interfering signals eliminated as described above.

In addition to the above-described embodiment concerned with the elimination of interference, the invention can also be applied by performing detection in the receiver by taking all of the received signals into account at the same time. The deterministic properties of the signals interfering with the desired signal, such as their power level and code phase, are utilized in the detection.

Figure 3:
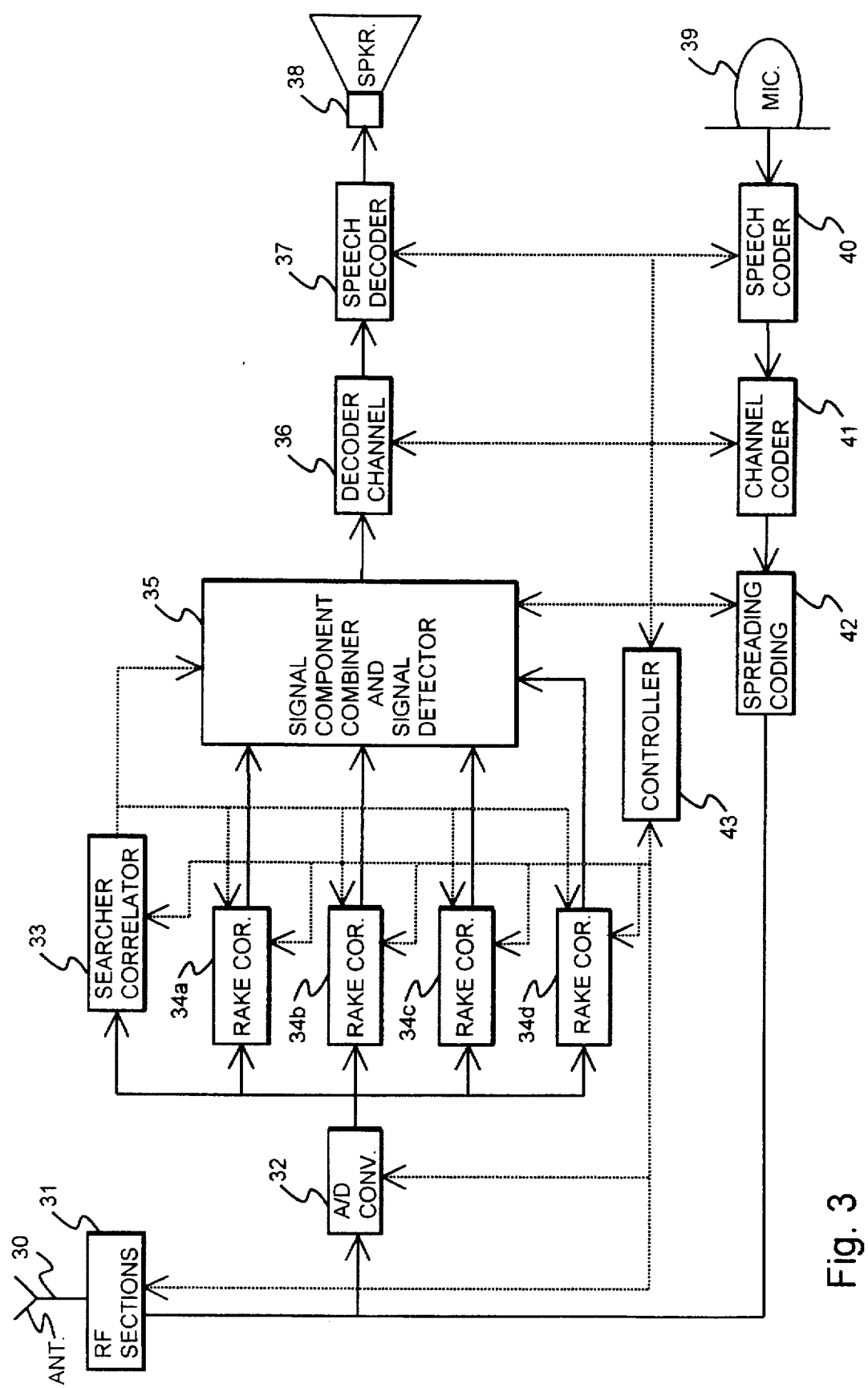
FIG. 3 shows an example of an implementation of the mobile station according to the invention.

FIG. 3 illustrates the configuration of a mobile station MS according to the invention. In the receiving direction the mobile station comprises an antenna 30 which forwards the received signal via radio-frequency sections 31 to an A D converter 32. The converted signal is applied to RAKE correlators 34a to 34d, each one of which has synchronized with a different signal component originating from one or another of the base stations. In addition, the A D-converted signal is applied to a searcher correlator 33, the function of which is to search for signal components transmitted with a desired spreading code by measuring the impulse response of the channel. From the correlators, the signal is applied to means 35 which preferably combine the received signal components and detect the signal. From the combiner the signal is applied to a channel decoder 36 and further via a speech decoder 37 to a loudspeaker 38.

In the transmission direction, a signal from a microphone 39 is applied via a speech coder 40 and a channel coder 41 to spreading coding 42, from which the signal is applied via the RF sections 31 to the antenna 30. The mobile station further comprises means 43 controlling all of the above-mentioned blocks. The means 43 of the mobile station can store information about the spreading codes used on the connections of neighboring base stations possibly interfering with the desired signal. This information can be forwarded to the correlators 33, 34a to 34d of the mobile station, which are able to detect the code phase of a signal using the known spreading code of a base station of the neighboring cell and measure its power level. In the detection of the desired signal, the means 35 can utilize the code phases and power levels of the signals of the neighboring base station received by the correlators 34a to 34d.

According to a preferred embodiment of the invention, the means 43 of the mobile station are able to estimate the interference caused by the measured channel of the neighboring cell by calculating a cross-correlation between the desired signal transmitted from the presently dedicated base station and the measured signal from the neighboring base station on the basis of the code phases of the signals and weighting the cross-correlation by the power levels. The mobile station further comprises means 43 for eliminating the calculated interference from the desired signal.

In addition to the above alternatives, the mobile station can also be implemented so that all of the received signals are taken into account at the same time in the detection.

Even though the invention has been described above with reference to the example shown in the attached drawings, it is obvious that the invention is not limited to this example, but it may be modified in various ways within the inventive idea claimed in the attached claims.

We claims:

1. A method for eliminating multiple-access interference in CDMA cellular radio system having a plurality of cells each comprising at least one base station arranged for communicating by CDMA with mobile stations present in a geographic area covered by the respective cell, comprising the steps of:

at least one said base station of one said cell, being a presently dedicated base station relative to at least a respective one of said mobile stations and being bordered by at least another, neighboring said cell having a respective neighboring base station, informing said mobile station of at least one CDMA spreading code used in said one cell and at least one CDMA spreading code used in at least one said neighboring cell;

said one base station and at least one said neighboring base station respectively transmitting components of a desired signal and a signal to be measured, on respective channels, using respective CDMA spreading codes;

said mobile station measuring the code phase and power level of a respective channel of each of said one cell and said at least one neighboring cell, using respective CDMA spreading codes as made known to said mobile station by said practicing of said informing step; and said mobile station detecting, from signal components thereby received, said desired signal, by eliminating interference from said signal components as received by said mobile station, based on said measuring.

2. The method of claim 1, wherein said detecting by eliminating comprises:

said mobile station estimating interference caused by at least one said respective channel of said at least one neighboring cell using a DMS spreading code for the respective neighboring cell as made known to said mobile station by said practicing of said informing step, by:

calculating a cross-correlation between components of said desired signal as detected from respective transmissions of said one base station and said at least one neighboring base station, and weighting said cross-correlation with respective power levels obtained in said measuring step; and said mobile station subtracting interference thereby estimated, from the signal components received, to obtain the desired signal.

3. The method of claim 1, wherein:

said at least one CDMA spreading code used in said at least one said neighboring cell, of which said base station informs said mobile station in said informing step comprises a spreading code used on a traffic channel of a respective neighboring cell.

4. The method of claim 1 wherein:

said at least one CDMA spreading code used in said at least one said neighboring cell, of which said base station informs said mobile station in said informing step comprises a spreading code used on a pilot channel of a respective neighboring cell.

5. The method of claim 1, wherein:

in conducting said informing, said base station transmits to said mobile station on a control channel.

6. The method of claim 1, wherein:

in conducting said informing, said base station informs said mobile station in regard to less than all spreading codes in use by said at least one neighboring cell, by including at least one more likely to correlate with multiple-access interference, and by excluding at least one less likely to correlate with multiple-access interference, as experienced by said mobile station.

7. The method of claim 6, wherein:

said including and excluding is practiced at least in part based on relative power levels of transmissions by the at least one neighboring base station.

8. The method of claim 6, further comprising:

a base station controller in control of said base station determining for said base station which CDMA spreading codes said base station will inform said mobile station of in said informing step.

9. The method of claim 1, further comprising:

practicing of said informing step being initiated by said mobile station requesting said base station to so inform said mobile station.

10. The method of claim 1, wherein:

said base station is a presently dedicated base station as to at least another respective one of said mobile stations; and said informing step is practiced by said base station in regard to less than all of said mobile stations for which said base station is a presently dedicated base station, depending on relative likelihood of experiencing multiple-access interference.

11. A mobile station useable for eliminating multiple-access interference when communicating in a CDMA cellular radio system having a plurality of cells each comprising at least one base station arranged for communicating by CDMA with mobile stations present in a geographic area covered by the respective cell, when said base station is performing as a dedicated base station relative to at least one mobile station, including said base station, and while bordered by at least another, neighboring said cell having a respective neighboring base station, said mobile station comprising:

receiver means for causing said mobile station to become informed by said base station of at least one CDMA spreading code used in said one cell and at least one CDMA spreading code used in at least one said neighboring cell, and for detecting components of a desired signal and a signal to be measured, respectively transmitted by said base station and said at least one neighboring base station, on respective channels, using respective CDMA spreading codes;

measuring means arranged for measuring the code phase and power level of a respective channel of each of said one cell and said at least one neighboring cell, using respective CDMA spreading codes as made known to said mobile station by said practicing of said informing; and detecting by eliminating means for detecting, from signal components thereby received, said desired signal, by eliminating interference from said signal components as received by said mobile station, based on said measuring.

12. The mobile station of claim 11, wherein said detecting by eliminating means is arranged for:

estimating interference caused by at least one said respective channel of said at least one neighboring cell as made known to said mobile station by said practicing of said informing, by:

calculating a cross-correlation between components of said desired signal as detected from respective transmissions of said one base station and said at least one neighboring base station, and weighting said cross-correlation with respective power levels obtained in said measuring; and for subtracting said mobile station interference thereby estimated, from the signal components received, to obtain the desired signal.

13. The mobile station of claim 11, further including:

storage means for storing information about the CDMA spreading codes in use on connectors of said at least one neighboring base station which are capable of interfering with reception by said mobile station of said desired signal;

said mobile station being arranged for using said information as stored by said storage means, in practicing said eliminating.

\* \* \* \* \*